United States Patent [19]

Ronden et al.

[11] 3,725,317
[45] Apr. 3, 1973

[54] NUCLEATION OF THERMOPLASTIC POLYMERIC FOAMS

[75] Inventors: Clifford P. Ronden, Edmonton, Alberta, Canada; Donald C. Roylance, Potomac, Md.

[73] Assignee: Cupples Container Co., Austin, Tex.

[22] Filed: Nov. 30, 1970

[21] Appl. No.: 93,881

[52] U.S. Cl. ......260/2.5 E, 260/2.5 HA, 260/2.5 HB, 260/2.5 N, 260/18 N, 260/23 A, 260/23 S, 260/23 H, 260/33.6 PQ, 260/33.6 UA, 260/33.8 UA, 260/78 S, 260/88.1 P, 260/91.7, 260/92.1, 260/93.7, 260/94.9 GD, 264/54
[51] Int. Cl. ..........................G08f 47/10, C08f 33/02
[58] Field of Search ...260/2.5 E, 2.5 HB, 23 S, 18 N; 264/54

[56] References Cited

UNITED STATES PATENTS

| | | | |
|---|---|---|---|
| 3,151,192 | 9/1964 | Jacobs et al. | 260/2.5 E |
| 3,575,897 | 4/1971 | Port et al. | 260/2.5 R |
| 3,466,353 | 9/1969 | Turner | 260/2.5 B |

FOREIGN PATENTS OR APPLICATIONS

| | | | |
|---|---|---|---|
| 210,728 | 10/1957 | Australia | 260/2.5 E |
| 1,052,289 | 12/1966 | Great Britain | 260/2.5 E |

*Primary Examiner*—Samuel H. Blech
*Assistant Examiner*—Wilbert J. Briggs, Sr.
*Attorney*—Roylance, Abrams, Berdo & Kaul

[57] ABSTRACT

In producing thermoplastic polymeric foams, particularly polystyrene, as by melt extrusion with the aid of a blowing agent, nucleation is accomplished by providing in the thermally plastified polymeric material the combination of an ammonium salt of a carboxylic acid, typically ammonium acetate, a carbonate or bicarbonate, and ammonium chloride. Under conditions of extrusion, for example, the two ammonium salts are thermally decomposed to yield both ammonia, as a nucleating agent, and acidic products which in turn react with the carbonate or bicarbonate to yield carbon dioxide as an additional nucleating agent.

15 Claims, No Drawings

NUCLEATION OF THERMOPLASTIC POLYMERIC FOAMS

This invention relates to the production of closed cell foamed thermoplastic polymeric shapes, particularly sheet, by extrusion.

In the production of closed cell foamed thermoplastic products by extrusion, it is common practice to employ both a blowing agent, as the primary cell former, and a nucleating agent, the latter serving to control cell size and uniformity. While a wide variety of nucleating agents have been proposed, particular success has been achieved by prior-art workers with carbon which accumulates produced in situ in the thermally plastified polymeric material in the extruder. Perhaps the most successful of the prior-art procedures has been to incorporate both citric acid and sodium bicarbonate in the polymeric material, these two additives reacting under the influence of heat in the plastified polymeric material to produce the desired carbon dioxide. That procedure has the disadvantage, however, that sodium citrate is also a product of the reaction and the sodium citrate tends to plate out, on the extruder screw and barrel, in the form of a hard deposit which can be removed only with difficulty and which accumulates in such quantity as to require frequent shut down of the extruder for cleaning. This difficulty is minimized if the citric acid is integrated into the particles of the polymeric material supplied to the extruder, but doing so is relatively expensive, significantly increasing the cost of raw materials.

Prior-art workers have accordingly sought to find alternative nucleating additives which would not form products adversely affecting extrusion. Such efforts have frequently led to the acceptance of solid, finely particulate inorganic materials which, though less expensive and relatively trouble-free in use, have failed to provide as good a nucleating effect as does in situ-formed carbon dioxide. While the desirability of nucleating additives or systems which produce a nucleating gas in situ has thus been reinforced, no truly satisfactory alternative to the citric acid-sodium bicarbonate procedure has been found. Further, the problem has been made more difficult by the current trend of the industry toward extrusion systems which introduce a blowing agent by injecting the same directly into the plastified mass of polymeric material in the extruder, which systems involve substantially higher temperatures in the extruder than is the case when the blowing agent is incorporated in particles of polymeric material supplied to the extruder. The higher temperatures employed in such "direct injection" systems have proved to be excessive for various nucleating additives which would otherwise be suitable.

A general object of the invention is to accomplish control of cell size and uniformity, in the extrusion of foamed polymeric thermoplastic materials, without the use of additives which cause reaction product plate-out to occur.

Another object is to devise an improved method for nucleation in foam extrusion systems of the direct injection type.

A further object is to provide a method of the type described wherein a plurality of nucleating gases are formed in situ in the thermally plastified mass being extruded.

Yet another object is to devise a method for extruding foamed polymeric thermoplastic products, in which a blowing agent is introduced by direct injection in the extruder, and wherein superior nucleation is accomplished by means of additives which can be admixed with, rather than integrated in, the particulate polymeric material supplied to the extruder.

A still further object is to provide improved compositions for melt extrusions of thermoplastic polymeric foams.

Another object is to produce polystyrne sheet especially suited for conversion by thermoforming into products having improved strength and rigidity.

Stated broadly, nucleation is accomplished according to the invention by combining with the raw particulate polymeric material a finely divided ammonium salt of a carboxylic acid, ammonium chloride, and a material capable of yielding carbon dioxide in the presence of acid, and carrying out melt extrusion under conditions such that the ammonium salt and ammonium chloride are thermally decomposed to yield ammonia and acidic products in situ in the extruder, the material employed as a carbon dioxide source then reacting with the acidic reaction products to produce carbon dioxide and inocuous salts.

The invention can be practiced with any thermoplastic polymeric material capable of being converted into a closed cell foam by melt extrusion with the aid of a blowing agent. Such polymeric materials include polystyrene, (poly) alpha-methylstyrene; (poly) ortho-methylstyrene; (poly) meta-methylstyrene; (poly) para-methylstyrene; the corresponding polymers of ethylstyrene and of the halogenated polystyrenes; copolymers of styrene with other monomers such as methyl methacrylate, methyl acrylate, ethyl acrylate, vinyl chloride, vinyl acetate and acrylonitrile; the polyolefins, including particularly polyethylene and polypropylene; the polyamides; and polymers of halogenated olefins, e.g., polytetrafluoroethylene.

Blowing (foaming) agents useful in accordance with the invention are those which accomplish foaming by volatilizing as the polymeric material is extruded, and include the normally liquid hydrocarbons such as pentane, isopentane, hexane and petroleum ether, which boil below the softening temperature of the polymeric material, and the fluorinated hydrocarbons having 1-4 carbon atoms and which may also contain chlorine and bromine, such as dichlorodifluoromethane, dichlorofluoromethane, chlorofluoromethane, difluoromethane, chloropentafluoroethane, 1,2-dichlorotetrafluoroethane, 1,1-dichlorotetrafluoroethane, 1,1,2-trichlorotrifluoroethane, 1,1,1 - trichlorotrifluoroethane, 2-chloro-1,1,1-trifluoroethane, 2-chloro-1,1,1,2 - tetrafluoreothane, 1-chloro-1,1,2,2-tetrafluoroethane, 1,2 - dichloro-1,1,2-trifluroethane, 1-chloro-1,1,2-trifluoroethane, 1-chloro-1,1-difluoroethane, perfluorocyclobutane, perfluoropropane, 1,1,1-trifluoropropane, 1-fluoropropane, 2-fluoropropane, 1,1,1,2,2-pentafluoropropane, 1,1,3,3 - pentafluorpropane, 1,1,1,2,3,3 - hexafluoropropane, 1,1,1-trifluoro-3-chloropropane, trifluoromethyl-ethylene, perfluoropropene and perfluorocyclobutene. Though the invention is not limited to the particular manner of introduction of the blowing agent, it is most advantageous in connection with extrusion procedures wherein the blowing agent is injected directly into the thermally plastified polymeric material in the extruder.

While any normally solid ammonium carboxylate can be employed in accordance with the invention, yielding both ammonia, as an in situ-produced nucleating gas, and an acidic product for reaction with the bicarbonate, ammonium acetate has been found to be particularly advantageous, not only because of its acceptable cost and favorable physical form but also because ammonium acetate pyrolizes readily under the conditions of temperature and pressure in the extruder. The ordinary ammonium acetate of commerce is of adequately fine particle size to assure good distribution throughout the mixture of polymer and additives, melts slightly above 233°F., assuring that the particles will survive until initial plastification of the polymeric material is attained in the feed section of the extruder, and contains no extraneous materials other than a small proportion of free acetic acid and water.

For purposes of broad operability, any alkali metal or alkaline earth metal carbonate or bicarbonate, excluding ammonium compounds, can be used as the carbon dioxide source material. Under the conditions of production extrusion, however, sodium bicarbonate is particularly advantageous.

Ammonium chloride is employed not only as a source of in situ-produced ammonia and to render the melt sufficiently acidic to cause the carbonate or bicarbonate to react, but also as an aid to thermal decomposition of the ammonium carboxylate. For reasons not as yet fully understood, the advantages of the invention are not achieved unless both an ammonium carboxylate and ammonium chloride are employed.

As to relative proportions, the ammonium carboxylate and ammonium chloride are employed in amounts each equal to 0.05–0.2 percent of the weight of the polymeric thermoplastic material, and the carbonate or bicarbonate is employed in an amount equal to 0.1–0.4 percent of the weight of the polymeric material. Best results are achieved when substantially equal proportions of the ammonium carboxylate and ammonium chloride are used. In extrusion of polystyrene with direction injection of the blowing agent into the plastified material in the extruder, optimum results are obtained with ammonium acetate as the carboxylate, with the amounts of ammonium acetate and ammonium chloride each being substantially equal to 0.1 percent of the weight of the polymeric material, and with the carbon dioxide source material being sodium bicarbonate in an amount substantially equal to 0.2 percent of the weight of the polymeric material.

Mixing of the ammonium carboxylate, ammonium chloride and carbonate or bicarbonate with the particulate polymeric material in such fashion that the additives are completely and uniformly distributed, both in the initial mixture and throughout the plastified material in the extruder, is of particular importance to successful nucleation in practicing the invention. Not only is it necessary for the in situ-produced ammonia to be generated uniformly throughout the plastified polymeric material, if the ammonia is to be effective for nucleation, but it is also necessary that the acidic reaction products resulting from thermal decomposition of the ammonium carboxylate and ammonium chloride be generated uniformly throughout the plastified mass so that there will be a maximum exposure of the reaction products to the carbon dioxide source material. The effectiveness of the mixing or blending step has an observable effect on the quantities of the additives required, larger proportions being required if the additives are less uniformly distributed with respect to the polymeric material. Accordingly, both for effectiveness of the method and for economy, it is advantageous to employ a special mixing step in preparing the feed for the extruder, this step being so carried out as to distribute the fine particles of the three additives uniformly on the surfaces of the larger particles of the polymeric material.

Advantageously, mixing is carried out with the aid of a small quantity, sufficient to wet the surface of the particles of the polymeric material, of a liquid capable of softening the surfaces of the polymeric particles, so that the finer particles of the nucleating additives will adhere thereto, and also capable of preventing any substantial agglomeration of the polymeric particles. Thus, the polymeric particles can be moistened with 0.05–0.5 percent of a liquid blend of a volatile solvent for the polymeric material and a volatile liquid in which the polymeric material is insoluble. In the case of polystyrene, for example, the liquid blend can consist of 25–75 percent by weight acetone and, correspondingly, 75–25 percent of a lower alkanol, advantageously methanol, with excellent results being obtained with a mixture of equal proportions of acetone and methanol.

The mixing step can be carried out in any suitable apparatus, a tumbling blender being particularly suitable. Advantageously, the polymeric material is first charged to the mixer, and the three nucleating additives are suspended or dissolved in the liquid blend of, e.g., acetone and methanol, the liquid composition then being introduced to the blender and mixing carried out for a period of time adequate to distribute the liquid over the surfaces of the polymeric particles and then allow the liquid blend to volatilize off, leaving the ammonium carboxylate, ammonium chloride and carbon dioxide source material uniformly distributed over, and adhered to, the surfaces of the polymeric particles. In this regard, it is advantageous to employ the polymeric material in the form of relatively large particles and to employ the additives in the form of finely particulate powders. Typically, the polymeric material can be in the form of granules with an average maximum dimension of, e.g., one-eighth in., and the three nucleating additives can be in powdered form having an average particle size less than 100 mesh.

The resulting extrusion compositions are dry, uniform, free-flowing blends of 100 parts by weight of the thermoplastic polymeric material or materials, 0.05–0.2 parts by weight of ammonium carboxylate, 0.05–0.2 parts by weight of ammonium chloride, and 0.1–0.4 parts by weight of the carbonate or bicarbonate.

Extrusion can be carried out in a conventional extruder of the type employing a screw or screws operated to both mix and advance the polymeric material through a series of confined zones within, e.g., a barrel equipped with heaters arranged to maintain the zones at predetermined temperatures, the advance of the plastified material being continuous through a final zone terminating at the die orifice, so that the product is extruded continuously. When the blowing agent is to be injected directly into the extruder, rather than being carried by the virgin polymeric feed material, the extruder can be considered as having a feed end; a feeding zone in which material is plastified, initially mixed, and advanced at a metered rate; an injection location at which the blowing agent is injected in liquid form; a mixing and cooling zone terminating at the die throat; and the final zone defined by the die structure, including the die lips. Though more broadly applicable, the invention offers its greatest advantage when practiced with direct injection of the blowing agent, the feed end and feed zone temperatures then being higher than those considered optimum for conventional nucleating systems of some types, and high quality of the extruded foam being more difficult to achieve with all agents of the prior-art.

The following example is typical of method embodiments of the invention:

EXAMPLE 1

The extrusion composition consisted of 100 parts by weight general purpose polystyrene granules or pellets having an average maximum dimension of one-eighth in., 0.1 part by weight of commercial grade ammonium acetate, 0.1 part by weight of commercial grade ammonium chloride, and 0.2 part by weight of sodium bicarbonate, the three nucleating additives having an average particle size of less than 100 mesh. The composition was prepared by stirring the ammonium acetate, ammonium chloride and sodium bicarbonate into 0.002 parts by weight of an equal blend of acetone and methanol, charging the polystyrene to a tumbling blender, pouring in the liquid blend containing the nucleating agents, tumbling for 30 min., and then adding the sodium bicarbonate and tumbling until uniform.

The composition so prepared was supplied to a twin screw extruder of the type identified as an RC 19/18 LMP Extruder manufactured by Lavorazione Materieplastiche S.P.A., Turino, Italy, at a feed rate of 240 lbs./hr., with the extruder operating at a screw r.p.m. of 1,900 and a load of 40 amp. A die having a circular orifice was employed, with the extruded product being a continuous tube having a 53.5 in. diameter and an average thickness of 0.07 in., the tube being hauled off at the rate of 26 ft./min. and slit into two continuous webs for thermoforming. The temperature profile of the extruder was maintained as follows:

| Zone | Temp. In °F |
|---|---|
| 1 (feed) | 510 |
| 2 | 500 |
| 3 | 430 |
| 4 | 320 |
| 5 | 320 |
| 6 | 290 |
| 7 (die throat) | 300 |
| 8 (die lips) | 310 |
| 9 (die lips) | 290 |
| 10 | 285 |

Dichlorodifluoromethane, as the blowing agent, was injected between zones 2 and 3, with the injection pressure held between 1,600 and 1,850 p.s.i., at the rate of 15 lbs./hr., providing a proportion of blowing agent amounting to approximately 6 percent, based on the weight of the polystyrene.

The extruded foamed polystyrene sheet had a density between 4 and 5 lbs./cu. ft., with uniform cells, the average cell length being in the range of 0.025–0.037 in. The sheet thermoformed well, and both meat trays and egg cartons were produced therefrom successfully, the thermoformed products having distinctly greater stiffness and strength than did like products produced from sheet similarly extruded with citric acid and sodium bicarbonate used conventionally for nucleation.

With numerous extrusion runs carried out over many hours in accordance with this example, no plate-out was observed.

EXAMPLE 2

The procedure of Example 1 is repeated, but substituting ammonium formate for the ammonium acetate.

EXAMPLE 3

The procedure of Example 1 is repeated, but substituting 0.05 parts by weight of ammonium tartrate for the ammonium acetate.

In making comparative runs with polystyrene, generally in accordance with Example 1, to compare the nucleating effect obtained according to the invention with that obtained with the conventional citric acid-sodium bicarbonate nucleating system, it was found that foamed polystyrene sheet prepared according to the present invention has a markedly greater post-expansion capability than does sheet produced with citric acid and sodium bicarbonate. This is demonstrated by the following example.

EXAMPLE 4

The extrusion composition of Example 1 was extruded in the extruder described in Example 1, with the conditions remaining generally the same save that the temperature profile of the extruder was maintained as follows:

| Zone | Temp. In °F |
|---|---|
| 1 | 520 |
| 2 | 500 |
| 3 | 430 |
| 4 | 220 |
| 5 | 220 |
| 6 | 290 |
| 7 | 290 |
| 8 | 290 |
| 9 | 295 |
| 10 | 280 |

The blowing agent employed was a mixture of 95 percent dichlorodifluormethane and 5 percent pentane, injected as described in Example 1. The extruded sheet had an average thickness of 0.094 in. and an average density of 5.4 lbs./cu. ft. This sheet will be referred to as Sheet A.

An additional extrusion run was made with the extrusion composition comprising 100 parts by weight of the same polystyrene granules, 0.3 part by weight citric acid and 0.3 part by weight sodium bicarbonate. The extrusion conditions were generally the same as in Example 1, with the temperature profile of the extruder maintained as follows:

| Zone | Temp. In °F |
|---|---|
| 1 | 520 |
| 2 | 500 |
| 3 | 430 |
| 4 | 220 |
| 5 | 220 |
| 6 | 290 |
| 7 | 290 |
| 8 | 290 |
| 9 | 290 |
| 10 | 260 |

The blowing agent was again a blend of 95 percent dichlorodifluoromethane and 5 percent pentane. The sheet obtained, hereafter referred to as sheet B, had an average thickness of 0.116 in. and an average density of 8.5 lbs./cu. ft.

Twenty-four hours after manufacture, samples of sheet A and sheet B were passed through the heating section of a thermoforming apparatus having 3 successive zones maintained at temperatures of 400°F., 265°F., and 265°F., respectively. The conditions in the thermoforming apparatus were maintained the same for all sheet samples, so that the extent of post expansion for sheets A and B could be validly compared. After passing through the thermoformer heating section, sheet A had an average thickness of 0.156 in., while the average thickness for sheet B after being passed through the thermoformer heating section was 0.129 in. Calculating the percent post expansion by dividing the original thickness into the post expanded thickness and multiplying by 100, the value for sheet A is 160 percent, and only 111% for sheet B.

The extruded sheet, before post expansion, was more flexible in the case of sheet B and sheet B had somewhat smaller cells. The cell size was uniform in both sheet A and sheet B. After post expansion, sheet A was markedly stiffer and stronger than was sheet B after post expansion.

What is claimed is:

1. In the production of foamed sheet by extrusion with the aid of a blowing agent, a thermoplastic polymeric material capable of being converted into a closed cell foam by melt extrusion with the aid of a blowing agent, said material being selected from the group consisting of polymers of a styrene, polymers of an olefin, polymers of a halogenated olefin and polyamides the improvement comprising providing in the plastified polymeric material in the extruder an ammonium carboxylate in an amount equal to 0.05–0.2 percent of the weight of the polymeric material, ammonium chloride in an amount equal to 0.05–0.2 percent of the weight of the polymeric material, and a material capable of liberating carbon dioxide in the presence of acid under the conditions of extrusion, said material being selected from the group consisting of the alkali metal and alkaline earth metal carbonates and bicarbonates and being present in an amount equal to 0.1–0.4 percent of the weight of the polymeric material; and operating the extruder at a feed end temperature of at least about 475°F. to cause thermal decomposition of said ammonium carboxylate and ammonium chloride to form ammonia and acidic reaction products and to cause said carbon dioxide liberating material to react to produce carbon dioxide, the ammonia and carbon dioxide so produced acting as nucleating agents for the cell-forming action of the blowing agent.

2. The method defined in claim 1, wherein said ammonium carboxylate is ammonium acetate.

3. The method defined in claim 1, wherein the thermoplastic polymeric material is polystyrene, the ammonium carboxylate is ammonium acetate, and the ammonium acetate and ammonium chloride are each employed in an amount substantially equal to 0.1 percent of the weight of the polystyrene.

4. The method defined in claim 3, wherein the carbon dioxide liberating material is sodium bicarbonate in an amount substantially equal to 0.2 percent of the weight of the polymeric material.

5. The method defined in claim 1, wherein the thermoplastic polymeric material is polystyrene, the blowing agent employed comprises a halogenated hydrocarbon and is injected into the thermally plastified material in the intruder, and the extruder is operated at a feed end temperature of at least 500°F.

6. The method defined in claim 5, wherein the ammonium carboxylate is ammonium acetate, and the carbon dioxide liberating material is sodium bicarbonate.

7. The method defined in claim 6, wherein the ammonium acetate and ammonium chloride are employed in substantially equal amounts.

8. The method defined in claim 7, wherein the ammonium acetate and ammonium chloride are each employed in an amount substantially equal to 0.1 percent of the weight of the polystyrene, and the sodium bicarbonate is employed in an amount substantially equal to 0.2 percent of the weight of the polystyrene.

9. The method defined in claim 1, wherein the thermoplastic polymeric material, the ammonium carboxylate, the ammonium chloride, and the carbon dioxide liberating material are supplied to the extruder in the form of a dry blend, the thermoplastic polymeric material being in particulate form, and the ammonium carboxylate, ammonium chloride and sodium bicarbonate are supported on and adhered to the particles of the thermoplastic polymeric material.

10. An extrusion composition for the production of foamed polymeric material by melt extrusion, comprising 100 parts by weight of a thermoplastic polymeric material in particulate form, said material being selected from the group consisting of polymers of a styrene, polymers of an olefin, polymers of a halogenated olefin and polyamides;

0.05–0.2 part by weight of an ammonium carboxylate;

0.05–0.2 part by weight of ammonium chloride; and 0.1–0.4 part by weight of a carbon dioxide liberating material selected from the group consisting of the alkali metal and alkaline earth metal carbonates and bicarbonates.

11. The extrusion composition defined in claim 10, wherein
the ammonium carboxylate is ammonium acetate.

12. The extrusion composition defined in claim 11, wherein
the thermoplastic polymeric material is polystyrene, and the ammonium acetate and ammonium chloride are each present in an amount substantially equal to 0.1 part by weight.

13. The extrusion composition defined in claim 12, wherein
the carbon dioxide liberating material is sodium bicarbonate in an amount substantially equal to 0.2 part by weight.

14. The extrusion composition defined in claim 10, wherein
the ammonium carboxylate, ammonium chloride and carbon dioxide liberating material are supported on the particles of the thermoplastic polymeric material.

15. The method for producing polystyrene sheet especially suited for conversion by thermoforming into products having improved strength and rigidity, comprising
supplying to an extruder a uniform mixture of
polystyrene in particulate form, an ammonium carboxylate in an amount equal to 0.05–0.2 percent of the weight of said polystyrene,
ammonium chloride in an amount equal to 0.05–0.2 percent of the weight of said polystyrene, and
a carbon dioxide liberating material selected from the group consisting of the alkali metal and alkaline earth metal carbonates and bicarbonates in an amount equal to 0.1–0.4 percent of the weight of said polystyrene,
said ammonium carboxylate, said ammonium chloride, and said carbon dioxide liberating material each being in particulate form and of a particle size which is small in comparison with that of said polystyrene;
advancing said mixture through the feed end portion of the extruder with a mixing action and there heating the same to a temperature of at least 475°F. to convert the polystyrene to a melt and to cause thermal decomposition of both said ammonium carboxylate and said ammonium chloride, yielding ammonia and acidic products,
said carbon dioxide reacting with said acidic products to produce carbon dioxide,
the ammonia and carbon dioxide being distributed through the polystyrene melt;
injecting into the melt in the extruder a normally liquid, low-boiling blowing agent comprising a major proportion of a halogenated hydrocarbon and a minor proportion of pentane; and further advancing the melt and extruding the same through a sheet-forming die to form foamed polystyrene sheet,
said ammonia and carbon dioxide acting as nucleating agents during foaming of the polystyrene.

* * * * *